(12) United States Patent
Verma et al.

(10) Patent No.: US 7,976,026 B2
(45) Date of Patent: Jul. 12, 2011

(54) METHODS AND APPARATUS TO FACILITATE SEALING IN ROTARY MACHINES

(75) Inventors: Nikhil Kumar Verma, Karnataka (IN); Imdad Imam, Schenectady, NY (US); Vineet Ghate, Bangalore (IN); Sean Douglas Feeny, Ballston Spa, NY (US); William Edward Adis, Scotia, NY (US); Shorya Awtar, Ann Arbor, MI (US); Jason Paul Mortzheim, Gloversville, NY (US)

(73) Assignee: General Electric Company, Schenectady, NY (US)

( * ) Notice: Subject to any disclaimer, the term of this patent is extended or adjusted under 35 U.S.C. 154(b) by 1106 days.

(21) Appl. No.: 11/796,815

(22) Filed: Apr. 30, 2007

(65) Prior Publication Data
US 2009/0309311 A1 Dec. 17, 2009

(51) Int. Cl.
*F16J 15/32* (2006.01)
(52) U.S. Cl. ..................................... 277/355
(58) Field of Classification Search .................. 277/303, 277/355, 411, 412, 422; 415/173.2, 173.3, 415/174.1, 174.2, 230, 231
See application file for complete search history.

(56) References Cited

U.S. PATENT DOCUMENTS

| 5,374,068 A | 12/1994 | Jewett et al. |
| 5,503,405 A | 4/1996 | Jewett et al. |
| 5,509,780 A | 4/1996 | Synfelt |
| 6,030,175 A | 2/2000 | Bagepalli et al. |
| 6,257,586 B1 | 7/2001 | Skinner et al. |
| 6,367,806 B1 | 4/2002 | Turnquist et al. |
| 6,695,316 B2 | 2/2004 | Popa et al. |
| 6,860,484 B2 * | 3/2005 | Urlichs .................. 277/412 |
| 7,032,903 B1 | 4/2006 | Dalton et al. |
| 7,059,821 B2 | 6/2006 | Farrell et al. |
| 7,066,468 B2 * | 6/2006 | Uehara et al. ............ 277/355 |
| 7,434,813 B1 * | 10/2008 | Franceschini et al. ...... 277/355 |

(Continued)

FOREIGN PATENT DOCUMENTS

| FR | 2650048 A1 * | 1/1991 |
| WO | WO 2006016098 | * 2/2006 |

OTHER PUBLICATIONS

Pending U.S. Appl. No. 11/796,927, filed Apr. 30, 2007. Inventor: Jason Paul Mortzheim, Methods and Apparatus to Facilitate Sealing in Rotary Machines.

*Primary Examiner* — Thomas Beach
*Assistant Examiner* — Gilbert Y Lee
(74) *Attorney, Agent, or Firm* — Armstrong Teasdale LLP

(57) ABSTRACT

A method and seal assembly for a rotary machine including a rotary component and a stationary component is provided. The method includes providing a seal housing including a front plate and a back plate that is spaced from the front plate such that a cavity is defined between the front plate and the back plate. The method also includes coupling a plurality of flexible compliant plates to at least one of the seal housing and the stationary component such that the compliant plates are spaced from the front plate and the back plate within the cavity, and coupling at least one projection to at least one of the seal housing and the compliant plates such that the at least one projection facilitates reducing flow through at least one of a first axial gap and a second axial gap that are defined between the seal housing and the compliant plates.

20 Claims, 6 Drawing Sheets

U.S. PATENT DOCUMENTS

| | | | |
|---|---|---|---|
| 2002/0105146 A1* | 8/2002 | Uehara et al. | 277/355 |
| 2006/0208427 A1* | 9/2006 | Wright et al. | 277/413 |
| 2006/0210392 A1* | 9/2006 | Enderby | 415/170.1 |
| 2008/0048399 A1* | 2/2008 | Nicholson et al. | 277/355 |
| 2009/0196742 A1* | 8/2009 | Turnquist et al. | 415/174.2 |
| 2010/0247309 A1* | 9/2010 | Ambrosy et al. | 415/230 |

* cited by examiner

METHODS AND APPARATUS TO FACILITATE SEALING IN ROTARY MACHINES

BACKGROUND OF THE INVENTION

This application relates generally to rotary machines and more particularly, to methods and apparatus for sealing a rotary machine.

At least some known rotary machines such as, but not limited to steam turbines and gas turbines, include a plurality of seal assemblies in a steam-flow path or a flow path to facilitate increasing operating efficiency of the rotary machine. At least some known seal assemblies are coupled between a stationary component and a rotary component to provide sealing between a high-pressure area and a low-pressure area. For example, to facilitate thrust balancing, a turbine rotor may be sealed relative to a cooperating stator to facilitate maintaining a higher pressure in a forward direction of the rotor as compared to a lower pressure in an aft direction of the rotor.

At least some known seal assemblies include seal members such as, but not limited to, brush seals and/or compliant plates. Compliant plates such as, but not limited to, leaf seals, shingles seals, and/or intermediate plate seals are generally aligned in a pack and oriented in a circumferential direction about a central rotational axis of a rotary component. More specifically, the compliant plates are generally arranged to engage and disengage the rotor or rotary component during various operating conditions of the rotary machine. For example, during shut down of the turbine engine, a portion of the compliant plates are generally in contact with a rotary component. During rotation of the rotary component, various forces generally act on the compliant plates to cause the plates to deflect upward. Such forces include, but are not limited to, compliant plate/rotor contact forces, hydrodynamic lifting forces, and differential pressure forces. Compliant plate/rotor contact forces are generated during contact between the compliant plate and the rotary component. Hydrodynamic lifting forces are generated by rotation of the rotary component. Differential pressure forces include radially outward lifting forces and radially inward blow-down forces that are generated due to the static pressure distribution on the compliant plates. Because a small amount of clearance between tips of the compliant plates and the rotary component facilitates reducing wearing of the compliant plates, a balance between such forces acting on the compliant plates is desirable to minimize seal leakage and to ensure that the compliant plate tips are disengaged from the rotary component during rotor rotation.

At least some known seal assemblies include a seal housing that includes at least a high-pressure-side front plate and a low-pressure-side back plate that is substantially parallel to, and spaced a fixed distance from, the front plate to define a cavity. In such seal assemblies, a physical gap between the compliant plates and the front plate, and a physical gap between the compliant plates and the back plate, are each defined based on the positional mounting of the compliant plates within the cavity. Known seal assemblies are generally assembled in an attempt to define some known specified gap widths between the seal housing and the compliant plates.

Generally, variations in sizes of the physical gaps are known to influence compliant plate movement and radial flow leakage in the seal assemblies. As such, known seal assemblies generally require smaller manufacturing tolerances to facilitate having actual widths of the gaps after manufacturing and assembly of the seals to be closer to the desired gap widths. However, fabricating seal assemblies with tighter tolerances to define smaller desirable gaps generally increases the fabrication complexity and the fabrication costs as compared to seal assemblies that are fabricated with larger tolerances to define larger gaps. Moreover, deviations from the specified gap sizes may cause the seal housing and the compliant plates of some known seal assemblies to rub and create frictional forces. Rubbing and/or frictional forces may reduce seal assembly life and/or increase the overall maintenance cost of the machine.

BRIEF DESCRIPTION OF THE INVENTION

A method for assembling a rotary machine including a rotary component and a stationary component is provided. The method includes providing a seal housing including a front plate and a back plate that is spaced from the front plate such that a cavity is defined between the front plate and the back plate. The method also includes coupling a plurality of flexible compliant plates to at least one of the seal housing and the stationary component such that the compliant plates are spaced from the front plate and the back plate within the cavity, and coupling at least one projection to at least one of the seal housing and the compliant plates such that the at least one projection facilitates reducing flow through at least one of a first axial gap and a second axial gap that are defined between the seal housing and the compliant plates.

A seal assembly for a rotary machine including a rotary component and a stationary component is provided. The seal assembly includes a seal housing including a front plate and a back plate that is spaced from the front plate such that a cavity is defined between the front plate and the back plate. The seal assembly also includes a plurality of flexible compliant plates spaced from the front plate and the back plate and coupled to at least one of the seal housing and the stationary component within the cavity. The seal assembly further includes at least one projection coupled to at least one of the seal housing and the compliant plates such that the at least one projection facilitates reducing flow through at least one of a first axial gap and a second axial gap that are defined between the seal housing and the compliant plates.

A rotary machine is provided. The rotary machine includes a stationary component fixed against rotation, a rotary component including an axis of rotation in which the rotary component is coaxial and opposite the stationary component. The rotary machine also includes a seal assembly coupled to the stationary component. The seal assembly includes a seal housing comprising a front plate and a back plate that is spaced from the front plate such that a cavity is defined between the front plate and the back plate, a plurality of flexible compliant plates spaced from the front plate and the back plate and coupled to at least one of the seal housing and the stationary component within the cavity, and at least one projection coupled to at least one of the seal housing and the compliant plates such that the at least one projection facilitates reducing flow through at least one of a first axial gap and a second axial gap that are defined between the seal housing and the compliant plates.

DETAILED DESCRIPTION OF THE INVENTION

The exemplary methods and apparatus described herein facilitate overcoming the mechanical disadvantages of known seal assemblies by providing static, and/or axially-adjustable, radial flow restriction structures on specified portions of seal housings and/or compliant plates of the exemplary seal assemblies.

It should be appreciated that "axial" and "axially" are used throughout this application to refer to directions and orientations extending substantially parallel to a central rotational axis of the rotary machine. It should also be appreciated that "radial" and "radially" are used throughout this application to refer to directions and orientations extending substantially perpendicular to the central rotational axis of the rotary machine. It should also be appreciated that "circumferential" and "circumferentially" are used throughout this application to refer to directions that circumscribe the central rotational axis of the rotary machine.

Figure 1:
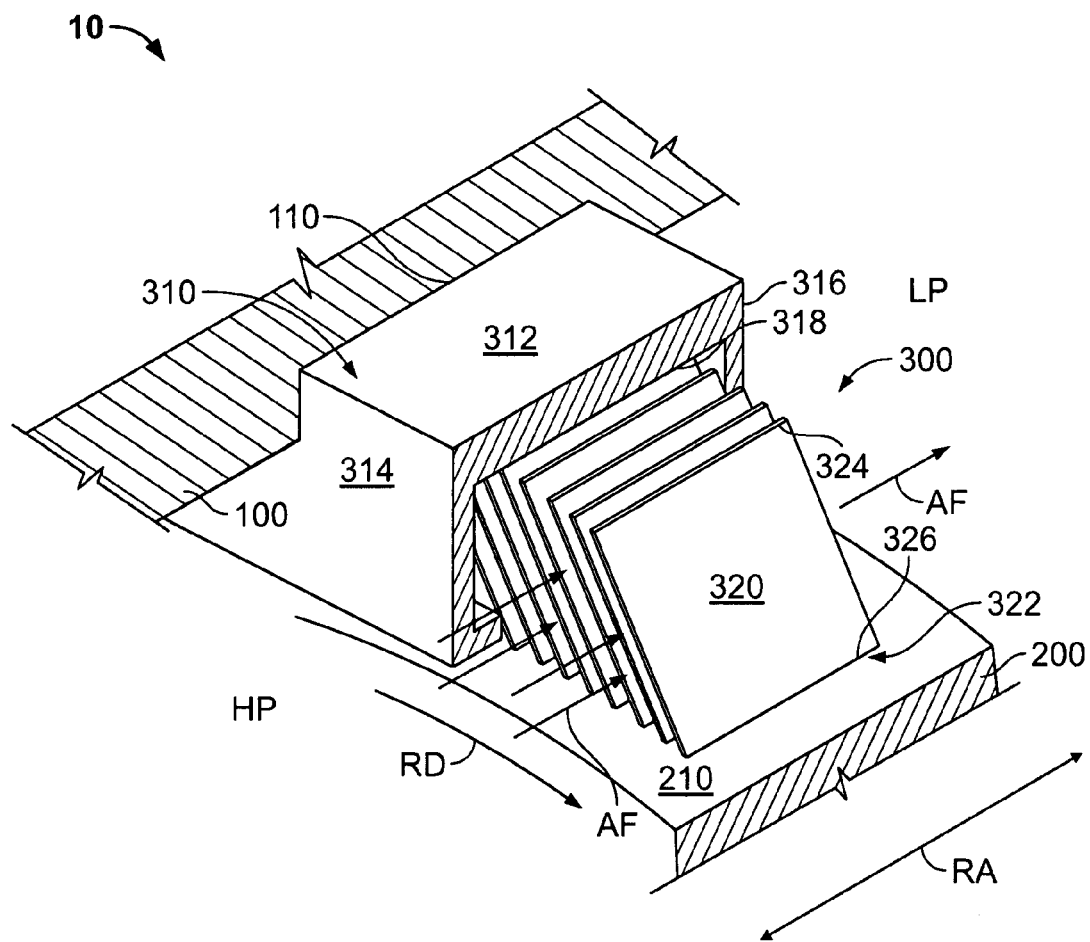
FIG. 1 is a partial perspective view of a portion of an exemplary rotary machine including a seal assembly.

FIG. 1 illustrates a partial perspective view of an exemplary rotary machine 10. In the exemplary embodiment, rotary machine 10 includes a stationary component 100, a rotary component 200, and a seal assembly 300. For example, rotary machine 10 may be a gas or steam turbine engine that includes a fixed stator and a rotatable rotor. However, it should be appreciated that rotary machine 10 may be any machine such as, but not limited to, a gas turbine engine, a steam turbine engine, and an aircraft engine.

Stationary component 100 includes an opening 110 defined therein. Component 100 is coupled substantially coaxially with respect to rotary component 200 such that a central axis CA of stationary component 100 is substantially colinear with a central rotational axis RA of rotary component 200. Moreover, in the exemplary embodiment, stationary component 100 is coaxial to rotary component 200 and opposite to an outer surface 210 of rotary component 200. It should also be appreciated that stationary component 100 includes any component that is fixed against rotation with respect to other components within rotary machine 10, and that rotary component 200 includes any component that rotates about the central rotational axis RA.

Figure 3:
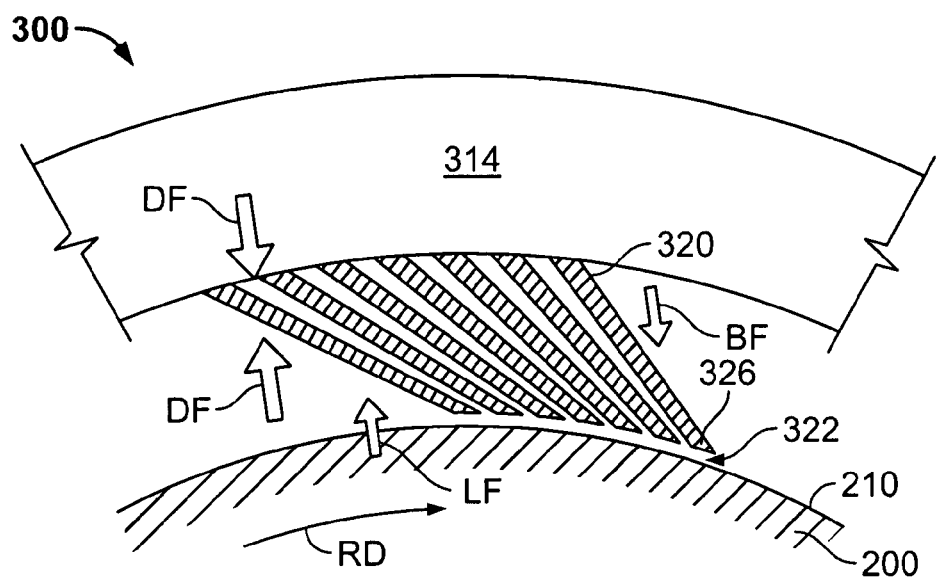
FIG. 3 is an enlarged front cross-sectional view of the seal assembly shown in FIG. 2.

In the exemplary embodiment, seal assembly 300 includes a seal housing 310 and a plurality of compliant plates 320. Housing 310 includes an upper wall 312 and two substantially parallel front and back plates 314 and 316 coupled together such that a cavity 318 is defined between front and back plates 314 and 316. Compliant plates 320 are coupled to upper wall 312 such that plates 320 are partially positioned, substantially aligned, and inclined within cavity 318. Referring to FIG. 3, seal assembly 300 is coupled between stationary component 100 and rotary component 200 to facilitate sealing a clearance gap 322 defined by components 100 and 200. Although seal assembly 300 is described as including housing 310, it should be appreciated that upper wall 312 may be removed, such that front plate 314, back plate 316, and compliant plates 320 are coupled to stationary component 100.

Figure 2:
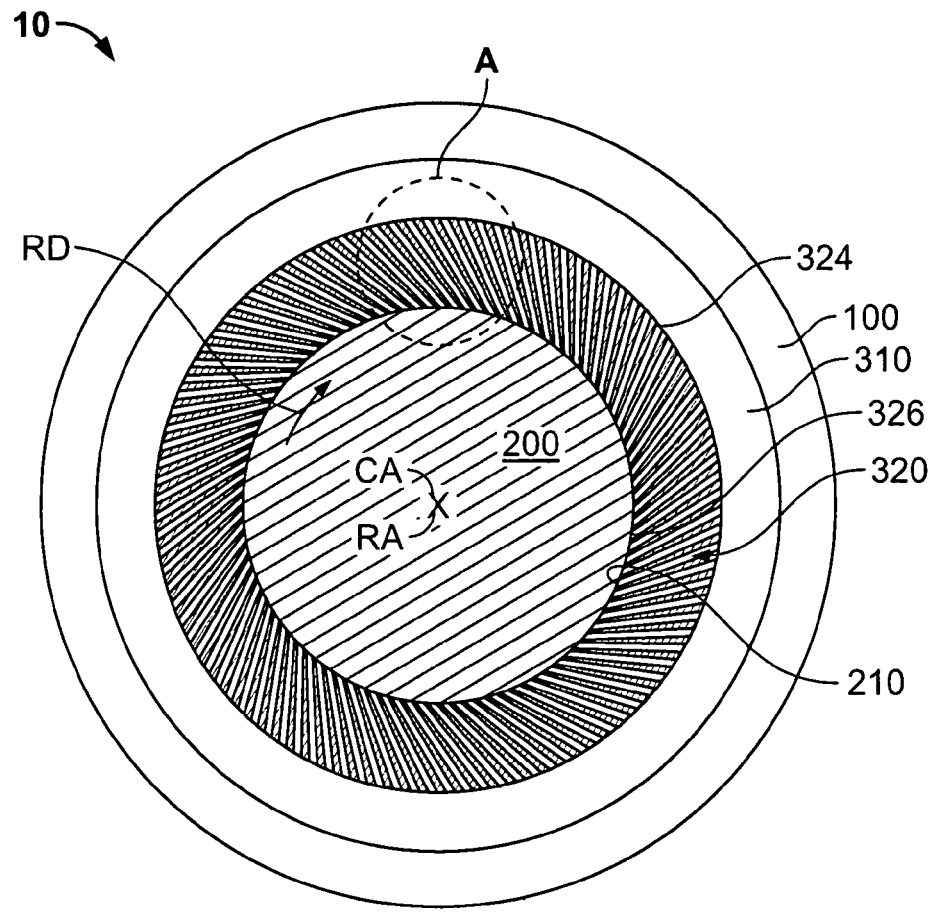
FIG. 2 is a cross-sectional view of the seal assembly shown in FIG. 1.

FIG. 2 is a cross-sectional view of seal assembly 300. In the exemplary embodiment, compliant plates 320 are aligned and inclined in a circumferential direction about central rotational axis RA. Radially outward end portions 324 of plates 320 are spaced adjacent to stationary component 100, and radially inward tips 326 of compliant plates 320 are coupled in a densely-spaced arrangement adjacent to component outer surface 210. Seal assembly 300 enables flow AF (shown in FIG. 1) to be channeled between compliant plates 320 such that the flow AF is closer to radially outward end portions 324 than to compliant plate tips 326. As such, compliant plates 320 facilitate controlling an amount of leakage through seal assembly 300.

FIG. 3 is an enlarged front cross-sectional view of seal assembly 300. In the exemplary embodiment, compliant plate tips 326 are spaced from rotary component 200 during rotation of rotary component 200 in rotational direction RD. Various rotary machine operations such as, but not limited to, start-up operations, turning gear operations, or shut down operations, may cause radial displacement of components 100 and 200 from their original start location. For example, known rotors and stators have different responses during various operating conditions. During start-up operations, for example, during rotation of the rotor, the rotor may move radially towards the stator. As operating temperatures increase, thermal expansion may cause the stator to move radially away from the rotor. During shut down operations, the growth process of the rotary machine may be reversed.

Throughout the various rotary machine operations, compliant plates are generally subjected to various forces such as, but not limited to, compliant plate/rotor contact forces ("BF"), hydrodynamic lifting forces ("LF"), differential pressure forces ("DF"), and/or frictional forces ("FF"). In attempts to facilitate balancing the above-identified forces and reduce radial flow leakage, known seal assemblies generally include axial gap widths defined between a seal housing and the respective compliant plates. An amount of radial flow leakage through a respective gap is function of geometry of the gap.

At least some known seal housing plates include entire inner surfaces that are substantially parallel and that face the compliant plates to define physical gaps having constant gap widths between the housing plates and the compliant plates. Because of the substantially parallel configuration of the inner surfaces, such known seal assemblies generally require assembly of the seal housing and compliant plates to define axial gaps having specified widths in attempts to control the radial flow leakage. It should be appreciated that the seal housing plates and inner surfaces may also be non-parallel and still define axial gaps between the seal housing and compliant plates. As such, such known seal assemblies are generally manufactured with tight tolerances to achieve desirable gap widths.

The above-referenced forces and/or radial flow leakage also attempt to affect the operation of the exemplary seal assemblies (shown in FIGS. 1-3). As discussed in more detail below with respect to FIGS. 4-10, the exemplary seal assemblies include radial flow restriction structures including various geometries that axially define larger physical gaps but generate smaller effective gaps as compared to known seal assemblies.

Figure 4:
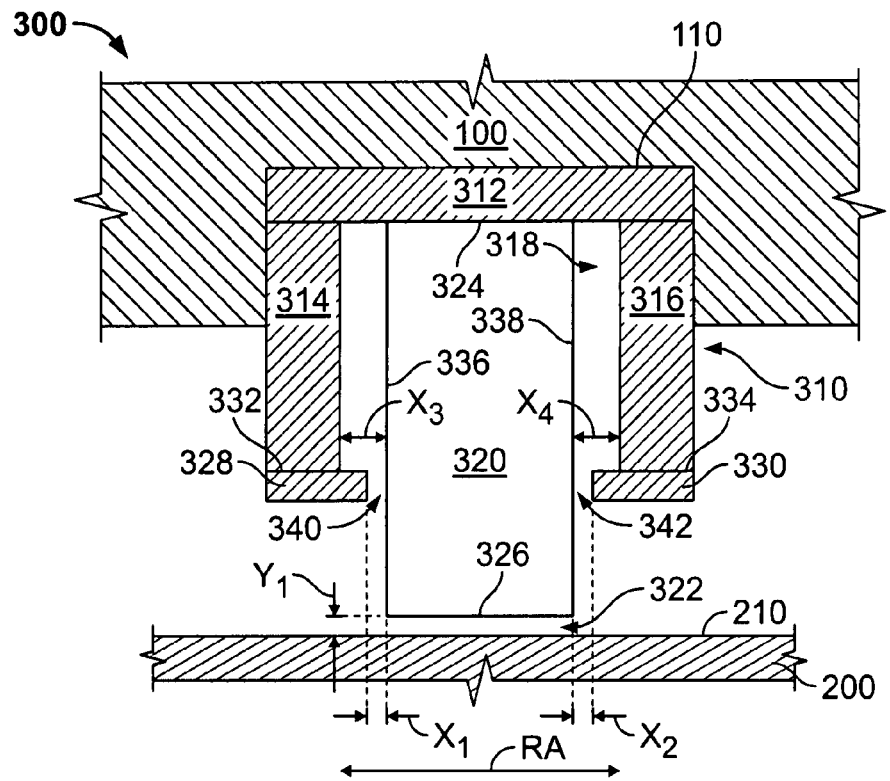
FIG. 4 is a schematic illustration of the seal assembly shown in FIGS. 1-3.

FIG. 4 is a schematic illustration of seal assembly 300. In the exemplary embodiment, seal assembly housing 310 includes a front projection 328 and a rear projection 330 that extend from radially inward end portions 332 and 334 of front and back plates 314 and 316, respectively. Although front and rear projections 328 and 330 have each been described as extending from radially inward end portions 332 and 334 of respective front and back plates 314 and 316, it should be appreciated that front and/or rear projections 328 and 330 may extend from any radial portion of respective front and back plates 314 and 316. In one embodiment, front and rear projections 328 and 330 may be provided on either front plate 314 or back plate 316. Further, it should be appreciated that housing 310 may be fabricated as a unitary structure.

In the exemplary embodiment, compliant plates 320 include a front axial edge 336 that is spaced from front plate 314 and front projection 328, and a rear axial edge 338 that is spaced from back plate 316 and rear projection 330. It should also be appreciated that compliant plates 320 may include projections (not shown) which enable seal assembly 300 to function as herein described. When seal assembly 300 is fully assembled, first axial gap 340 having width $X_1$ is defined between front projection 328 and compliant plates 320, and a second axial gap 342 having width $X_2$ is defined between compliant plates 320 and rear projection 330.

By coupling front and rear projections 328 and 330, respectively, to front and back plates 314 and 316 respectively, radial forces induced by flow acting on compliant plates 320 is restricted based on gap widths $X_1$ and $X_2$ of gaps 340 and 342. As a result, the pressure distribution in seal assembly 300 is controlled such that compliant plates 320 are restricted to a specified amount of movement, i.e., lifting and/or lowering, that adjusts a clearance width $Y_1$ during operation. For example, if gap width $X_1$ is greater than gap width $X_2$, then the pressure distribution may cause compliant plate tips 326 to move toward rotary component 200. In contrast, if gap width $X_1$ is less than gap width $X_2$, then the lifting forces may cause compliant plate tips 326 to shift towards housing 310. As such, by controlling the width $X_1$ of gap 340 and the width $X_2$ of gap 342, the overall pressure distribution induced across seal assembly 300 may be controlled and distributed across front plate 314, back plate 316, and compliant plates 320.

By coupling front and/or rear projections 328 and 330 to only limited portions of front and back plates 314 and 316 respectively, housing 310 is structured to define physical gaps 340 and 342 having widths that vary radially between compliant plates 320 and housing 310. In the exemplary embodiment, gaps 340 and 342 are defined to include minimum gap widths $X_1$ and $X_2$ at only specified radial portions of housing 310. During operation, radial flow encounters front and/or rear projections 328 and 330 that facilitate forming wakes, vortices, and turbulent losses in the radial flow. As such, the geometries of the front and/or rear projections 328 and 330 disturb the radial flow to effectively make physical gaps 340 and 342 function as gaps having smaller widths as compared to gap widths $X_1$ and/or $X_2$. In other words, front and/or rear projections 328 and 330 virtually define effective gaps that are smaller than physical gaps 340 and 342.

Because the effective gaps are smaller than the physical gaps 340 and 342, front and/or rear projections 328 and 330 facilitate manufacturing seal assembly 300 to define gap widths $X_1$ and/or $X_2$ that are larger than the smaller constant axial gap widths of known seal assemblies which attempt to achieve a same reduction of radial flow leakage. Front and/or rear projections 328 and 330 also facilitate manufacturing seal assembly 300 to define gap widths $X_3$ and/or $X_4$ which are larger than gap widths $X_1$ and/or $X_2$, respectively. As a result, seal assembly 300 is manufactured with more flexible tolerances to define the larger gap widths as compared to known seal assemblies manufactured with tighter tolerance to define the smaller gap widths. As such, seal assembly 300 facilitates reducing the likelihood of radial flow debris being trapped in the gaps 340 and 342, and thus undesirably affecting seal performance.

During operation under high pressure, compliant plates 320 generally deform in axial directions such that gap widths $X_1$, $X_2$, $X_3$, and/or $X_4$ slightly change. Gap width variations are generally known to affect seal performance in undesirable ways. By fabricating seal assembly 300 to include larger gap widths $X_1$, $X_2$, $X_3$, and/or $X_4$, seal performance is more tolerant to manufacturing inconsistencies and/or imperfections in housing 310 surfaces that define such gap widths $X_1$, $X_2$, $X_3$, and/or $X_4$. As a result, seal assembly 300 facilitates decreasing seal performance sensitivities as compared to known seal assemblies. As such, seal assembly 300 facilitates reducing manufacturing costs and complexity.

Figure 5:
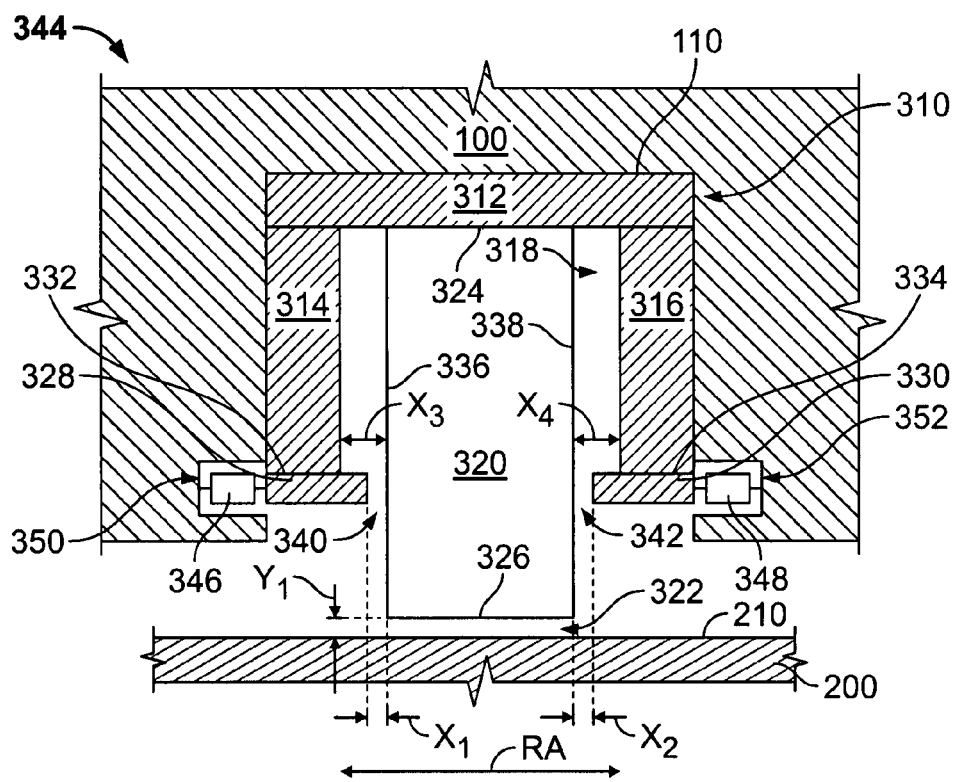
FIG. 5 is a schematic illustration of an alternative seal assembly that may be used with the rotary machine shown in FIG. 1.

FIG. 5 is a schematic illustration of an alternative seal assembly 344. Seal assembly 344 is substantially similar to the seal assembly 300 shown in FIGS. 1-4, and components in FIG. 5 that are identical to components of FIGS. 1-4, are identified in FIG. 5 using the same reference numerals used in FIGS. 1-4.

In the exemplary embodiment, seal assembly 344 includes axially-adjustable actuating mechanisms 346 and 348 such as, but not limited to, biasing members, bellows devices, piezo-electric devices, and/or any other device that axially adjusts or actuates front projection 328 and/or rear projection 330. In the exemplary embodiment, actuating mechanisms 346 and 348 are coupled within respective recesses 350 and 352 defined in stationary component 100. Although the stationary component 100 is described as having actuating mechanisms 346 and 348 coupled within recesses 350 and 352, it should be appreciated that mechanisms 346 and/or 348 may be coupled to any surface of stationary component 100 provided that mechanisms 346 and/or 348 are oriented and configured to axially adjust or actuate front projection 328 and rear projection 330, respectively.

Alternatively, front projection 328 and/or rear projection 330 may include internal actuating mechanisms. For example, in one embodiment, front projection 328 and rear projection 330 are fabricated from shape memory alloys such as, but not limited to, nickel-titanium, silver-cadmium, copper-aluminum-nickel, copper-zinc-aluminum, and/or iron-manganese-silicon alloys. Such shape memory alloys return to their original shape after being subjected to deformation and/or strain as a result of being heated to temperatures that are higher than a transformation temperature of the alloy. More specifically, shape memory alloys have material properties that change shape, position, stiffness, natural frequency, and/or other mechanical characteristics in response to temperature and/or electromagnetic field changes.

By varying gap widths $X_1$ and $X_2$ (shown in FIGS. 4 and 5), flow through the respective gaps 340 and 342 is also varied. As a result, the pressure distribution in seal assembly 344 is varied and causes movement, i.e., lifting and/or lowering, of compliant plates 320. Consequently, clearance 322 between compliant plate tips 326 and rotary component 200 may also be varied during various operating conditions of rotary machine 10.

By axially adjusting and actuating front projection 328 and/or rear projection 330, a pressure drop may be distributed across front plate 314, back plate 316, and compliant plates 320 as compared to known radially-adjustable seal assemblies. Also, by axially adjusting and actuating front projection 328 and/or rear projection 330, clearance 322 may be more accurately adjusted to a desired width $Y_1$ based on an operating condition of rotary machine 10 as compared to known radially-adjustable seal assemblies.

As a result, gap widths $X_1$ and $X_2$ may initially be defined wider than gap widths $X_1$ and $X_2$ (shown in FIG. 4) and subsequently adjusted based on an operating condition of rotary machine 10. As such, a controlled pressure distribution and clearance 322 between compliant plate tips 326 and rotary component 200 may be facilitated. Moreover, the overall pressure distribution induced across seal assembly 344 may be controlled and selectively distributed across front plate 314, back plate 316, and compliant plates 320. Further, by coupling front and/or rear projections 328 and 330, respectively, only to limited portions of front and back plates 314 and 316 respectively, radial flow restrictions, effective gap formations, increased gap widths $X_1$ and $X_2$, pressure distribution, reductions in seal performance sensitivities, reductions in radial flow debris trapping, and reductions in fabrication complexity, times and costs as compared to known seal assemblies may be facilitated while enabling substantially identical reductions in radial flow leakage amounts as known seal assemblies.

Figure 6:
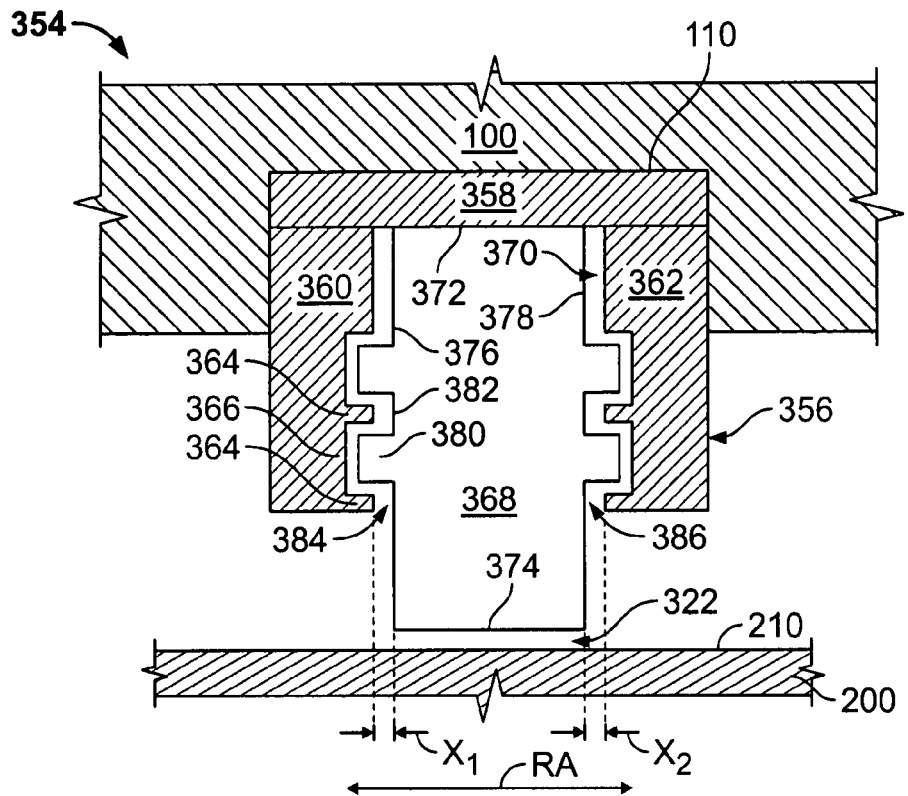
FIG. 6 is a schematic illustration of another alternative seal assembly that may be used with the rotary machine shown in FIG. 1.

FIG. 6 is a schematic illustration of another alternative seal assembly 354. Seal assembly 354 is substantially similar to the seal assembly 300 shown in FIGS. 1-4, and components in FIG. 6 that are identical to components of FIGS. 1-4, are identified in FIG. 6 using the same reference numerals used in FIGS. 1-4.

In the exemplary embodiment, seal assembly 354 includes a seal housing 356 including an upper wall 358, a front plate 360, and a back plate 362. In the exemplary embodiment, front and back plates 360 and 362 each include a plurality of projections 364 extending therefrom, and a plurality of recesses 366 defined between pairs of adjacent projections 364. It should be appreciated that projections 364 may extend from and recesses 366 may be defined in any radial portion of respective front and back plates 360 and 362. In one embodiment, projections 364 and/or recesses 366 may be provided on either front plate 360 or back plate 362. It should also be appreciated that any number, shape, size and/or location of projections 364 and/or recesses 366 may be provided. Additionally, it should be appreciated that projections 364 extending from front plate 360 may be staggered with respect to projections 364 extending from back plate 362. Further, it should be appreciated that housing 356 may be fabricated as a unitary structure.

Seal assembly 354 also includes a plurality of compliant plates 368 extending from upper wall 358 such that compliant plates 368 are partially positioned, aligned, and inclined within a cavity 370 defined between front and back plates 360 and 362. Compliant plates 368 each include a radially outward end portion 372, a radially inward tip 374, a front axial edge 376, a rear axial edge 378, and a plurality of projections 380, and a plurality of stepped edge recesses 382 that are defined in front and rear edges 376 and 378. It should be appreciated that projections 380 may extend from and recesses 382 may be defined in any radial portion of respective front and rear axial edges 376 and 378. In one embodiment, projections 380 and recesses 382 may be provided on either front axial edge 376 or rear axial edge 378. It should be appreciated that any number, shape, size and/or location of projections 380 and/or recesses 382 which enable seal assembly 354 to function as described herein may be provided. Additionally, it should be appreciated that projections 380 extending from front edge 376 may be staggered with respect to projections 380 extending from rear edge 378.

In the exemplary embodiment, compliant plates 368 extend from upper wall 358 such that projections 380 and recesses 382 are spaced from and face recesses 366 and projections 364, respectively. However, it should be appreciated that upper wall 358 of housing 356 may be removed, such that front plate 360, back plate 362, and compliant plates 368 are coupled to stationary component 100. When seal assembly 354 is fully assembled, a first axial gap 384 having a width $X_1$ is defined between front plate 360 and compliant plates 368, and a second axial gap 386 having a width $X_2$ is defined between compliant plates 368 and back plate 362. To facilitate avoiding potential contact and/or damage to compliant plates 368 and/or housing 356, it may be appreciated that radial clearances between projections 364 and projections 380 should be at least equal to the expected radial deflection of compliant plates 368 during rotor transients.

In the exemplary embodiment, gaps 384 and 386 are substantially winding gaps that are defined between projections 364, recesses 366, projections 380, and recesses 382. More specifically, each gap 384 and 386 is defined by a tortuous flow path for radial inlet and outlet airflows. As such, radial flows are required to turn in several directions within gaps 384 and 386 prior to entering and exiting seal assembly 354. By providing a plurality of projections 364 and/or 380 and recesses 366 and/or 382 only on limited portions of housing 356 and compliant plates 368 respectively, radial flow restrictions, effective gap formations, increased gap widths $X_1$ and $X_2$, pressure distribution adjustments, reductions in seal performance sensitivities, reductions in radial flow debris trapping, and reductions in fabrication complexity, time and costs as compared to known seal assemblies may be facilitated while enabling substantially identical reductions in radial flow leakage amounts as known seal assemblies.

By increasing the number of projections 364 and/or projections 380, flow restriction in the radial direction is also increased as compared to known seal assemblies that include no projection or fewer projections. By forming a plurality of recesses 382 and projections 380 that are complementary to respective projections 364 and recesses 366, gaps 384 and 386 further facilitate restricting additional flow in radial directions as compared to the seal assemblies 300 and 344 shown in FIGS. 1-5, respectively. As such, gap widths $X_1$ and $X_2$ may be defined wider than gap widths $X_1$ and $X_2$ (shown in FIGS. 4 and 5) while enabling substantially identical reductions in radial flow leakage amounts in each respective seal assembly 300 and 344. As a result, front and/or back plate projections 364 and compliant plates 368 facilitate reducing manufacturing tolerances associated with seal assembly 354 as compared to seal assemblies 300 and 344 shown in FIGS. 1-5, respectively, while enabling substantially identical amounts, and/or flow rates, of radial airflow in known seal assemblies.

Figure 7:
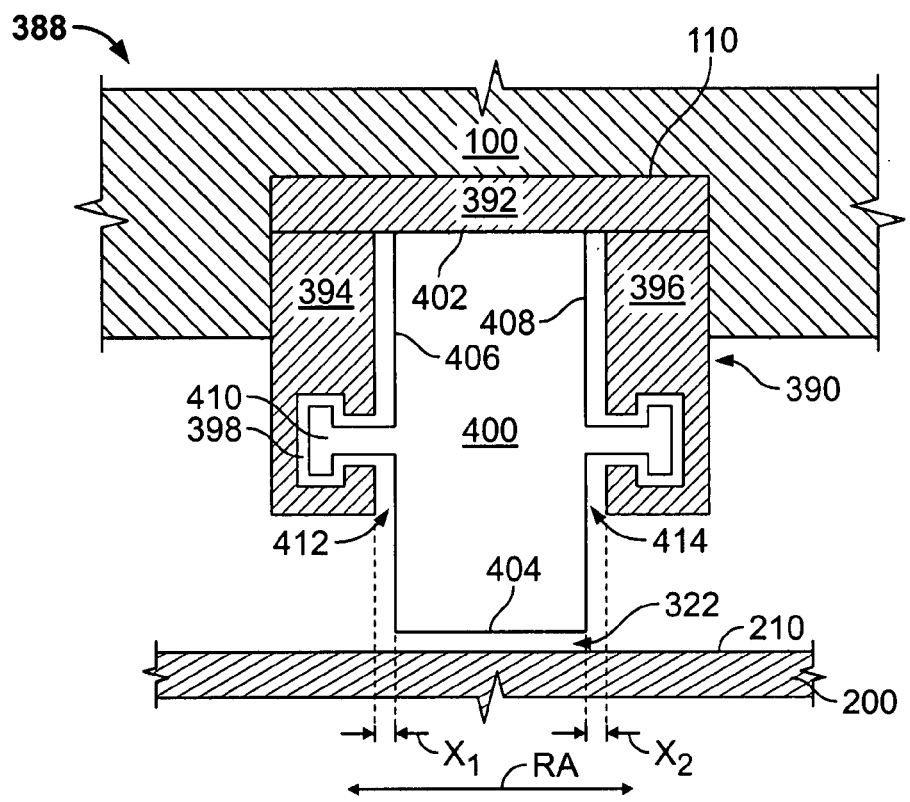
FIG. 7 is schematic illustration of yet another alternative seal assembly that may be used with the rotary machine shown in FIG. 1.

FIG. 7 is a schematic illustration of yet another alternative seal assembly 388. Seal assembly 388 is substantially similar to the seal assembly 354 shown in FIG. 6, and components in FIG. 7 that are identical to components of FIG. 6, are identified in FIG. 7 using the same reference numerals used in FIG. 6.

In the exemplary embodiment, seal assembly 388 includes a seal housing 390 including an upper wall 392, a front plate 394, and a back plate 396. In the exemplary embodiment, front and back plates 394 and 396 each include a plurality of locking recesses 398 defined therein. It should be appreciated that any number, shape, size, and/or location of recesses 398 which enable seal assembly 388 to function as described herein may be provided.

Seal assembly 388 also includes a plurality of compliant plates 400 that at each include a radially outward end portion 402, a radially inward compliant plate tip 404, a front axial edge 406, a rear axial edge 408, and a plurality of locking projections 410 defined in the front and rear edges 406 and 408. It should be appreciated that any number, shape, size, and/or location of projections 410 which enable seal assembly 388 to function as described herein may be provided. It should also be appreciated that compliant plates 400 may include recesses (not shown) and front and/or back plates 394 and 396 may include projections (not shown) which enable seal assembly 388 to function as herein described. When seal assembly 388 is fully assembled, a first axial gap 412 having a width $X_1$ is defined between front plate 394 and compliant plates 400, and a second axial gap 414 having a width $X_2$ is defined between compliant plates 400 and back plate 396. To facilitate avoiding potential contact and/or damage to compliant plates 400 and/or housing 390, it may be appreciated that radial clearances between recesses 398 and projections 410 should be at least equal to the expected radial deflection of compliant plates 400 during rotor transients.

During operation, flow variations may cause compliant plates 400 to twist in addition to lifting and/or lowering. Recesses 398 and projections 410 are configured such that projections 410 axially lock in recesses 398 to facilitate reducing a twisting motion of compliant plates 400. As a result, reduced twisting of compliant plates 400, and reduced friction between compliant plates 400 and front and/or rear edges 406 and 408 may be facilitated. Further, by providing recesses 398 only in limited portions of front and/or back plates 394 and 396, and/or projections 410 only extending from limited portions of compliant plates 400, radial flow restrictions, effective gap formations, increased gap widths $X_1$ and $X_2$, pressure distribution adjustment, reductions in seal performance sensitivities, reductions in radial flow debris trapping, and reductions in fabrication complexity, times and costs as compared to known seal assemblies may be facilitated while enabling substantially identical reductions in radial flow leakage amounts as known seal assemblies.

Figure 8:
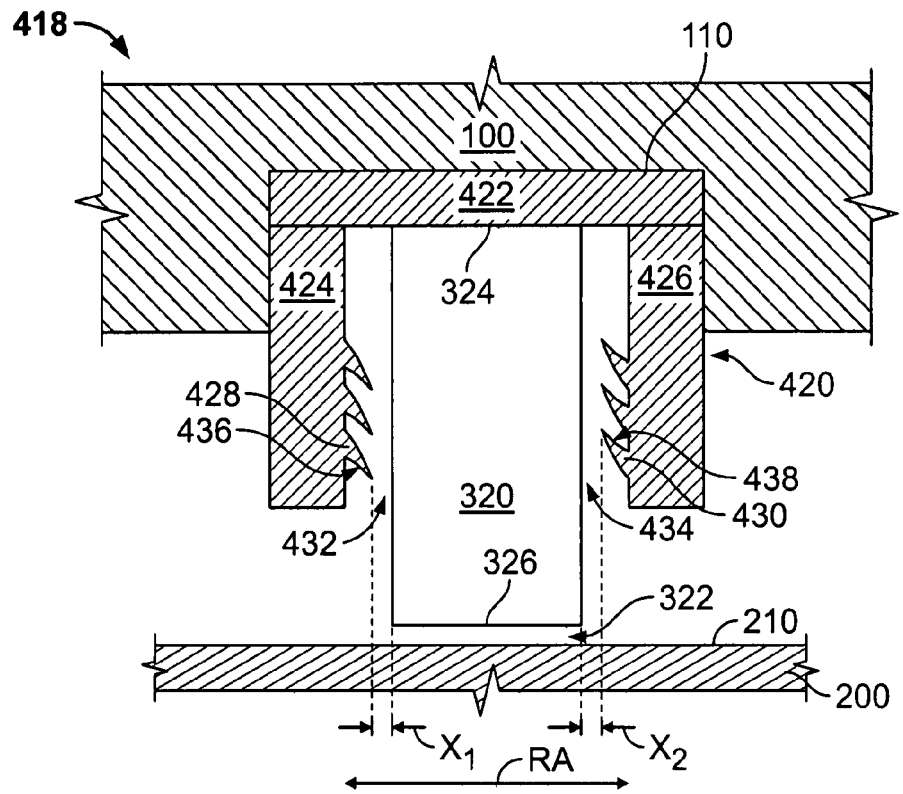
FIG. 8 is schematic illustration of a further alternative seal assembly that may be used with the rotary machine shown in FIG. 1.

FIG. 8 is a schematic illustration of a further alternative seal assembly 418. Seal assembly 418 is substantially similar to the seal assembly 354 shown in FIG. 6, and components in FIG. 8 that are identical to components of FIG. 6, are identified in FIG. 8 using the same reference numerals used in FIG. 6.

In the exemplary embodiment, seal assembly 418 includes a seal housing 420 including an upper wall 422, a front plate 424, and a back plate 426. In the exemplary embodiment, front plate 424 includes a plurality of radially-inward extending projections 428 and back plate 426 includes a plurality of radially-outward extending projections 430. When seal assembly 418 is fully assembled, a first axial gap 432 having a width X1 is defined between front plate 424 and compliant plates 320, and a second axial gap 434 having a width X2 is defined between compliant plates 320 and back plate 426.

Although front and rear projections 428 and 430 have each been described as extending from respective front and back plates 424 and 426, it should be appreciated that front and/or rear projections 428 and 430 may extend from any radial portion of respective front and back plates 424 and 426. In one embodiment, front and rear projections 428 and 430 may be provided on either front plate 424 or back plate 426. It should be appreciated that any number, shape, size and/or location of projections 428 and 430 may be provided. It should also be appreciated that compliant plates 320 may include projections (not shown) which enable seal assembly 418 to function as herein described. Further, it should be appreciated that housing 420 may be fabricated as a unitary structure.

During operation of seal assembly 418, for example, airflow circulations are created at respective airflow facing surfaces 436 and 438 of projections 428 and 430 because projections 428 and 430 are angled against radial flow directions of inlet and exit airflow, respectively. As such, airflow restriction in the radial direction is further facilitated as compared to seal assemblies with projections that are not angled against radial airflow, such as seal assembly 354 shown in FIG. 6. Further, by providing projections 428 and/or 430 only extending from limited portions of front and/or back plates 424 and 426, radial flow restrictions, effective gap formations, increased gap widths $X_1$ and $X_2$, pressure distribution adjustment, reductions in seal performance sensitivities, reductions in radial flow debris trapping, and reductions in fabrication complexity, times and costs as compared to known seal assemblies may be facilitated while enabling substantially identical reductions in radial flow leakage amounts as known seal assemblies.

Figure 9:
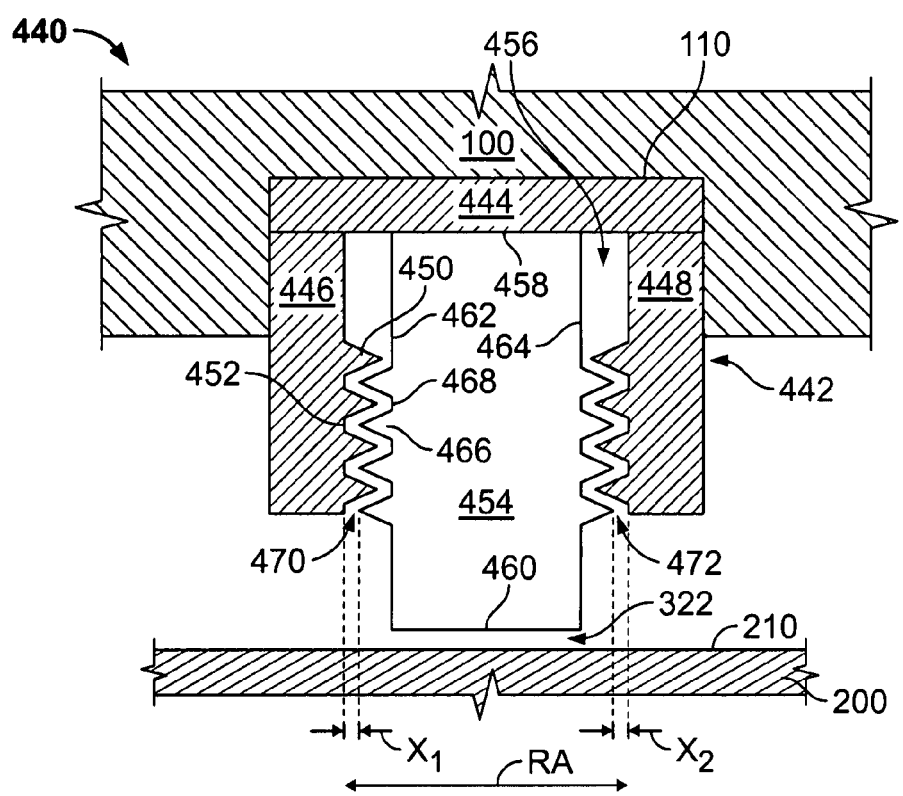
FIG. 9 is schematic illustration of yet another alternative exemplary seal assembly that may be used with the rotary machine shown in FIG. 1.

FIG. 9 is a schematic illustration of yet another alternative seal assembly 440. Seal assembly 440 is substantially similar to the seal assembly 354 shown in FIG. 6, and components in FIG. 9 that are identical to components of FIG. 6, are identified in FIG. 9 using the same reference numerals used in FIG. 6.

In the exemplary embodiment, seal assembly 440 includes a seal housing 442 including an upper wall 444, a front plate 446, and a back plate 448. In the exemplary embodiment, front and back plates 446 and 448 each include a plurality of projections 450 extending therefrom, and a plurality of recesses 452 defined between pairs of adjacent projections 450. It should be appreciated that projections 450 may extend from and recesses 452 may be defined in any radial portion of respective front and back plates 446 and 448. In one embodiment, projections 450 and/or recesses 452 may be provided on either front plate 446 or back plate 448. It should also be appreciated that any number, shape, size and/or location of projections 450 and/or recesses 452 may be provided. Additionally, it should be appreciated that projections 450 extending from front plate 446 may be staggered with respect to projections 450 extending from back plate 448. Further, it should be appreciated that housing 442 may be fabricated as a unitary structure.

Seal assembly 440 also includes a plurality of compliant plates 454 extending from upper wall 444 such that compliant plates 454 are partially positioned, aligned, and inclined within a cavity 456 defined between front and back plates 446 and 448. Compliant plates 454 each include a radially outward end portion 458, a radially inward tip 460, a front axial edge 462, a rear axial edge 464, and may have a plurality of projections 466 and a plurality of edge recesses 468 that are defined in front and rear edges 462 and 464. It should be appreciated that projections 466 may extend from and recesses 468 may be defined in any radial portion of respective front and rear axial edges 462 and 464. In one embodiment, projections 466 and recesses 468 may be provided on either front axial edge 462 or rear axial edge 464. Additionally, it should be appreciated that projections 466 extending from front edge 462 may be staggered with respect to projections 466 extending from rear edge 464.

When seal assembly 440 is fully assembled, a first axial gap 470 having a width $X_1$ is defined between front plate 446 and compliant plates 454, and a second axial gap 472 having a width $X_2$ is defined between compliant plates 454 and back plate 448. During operation of seal assembly 440, for example, airflow in the radial direction partially follows a flow path defined by projections 450 and 466 and recesses 452 and 468. By providing projections 450 and 466 and recesses 452 and 468 only on limited portions of housing 442 and compliant plates 454 respectively, radial airflow restrictions, effective gap formations, increased gap widths $X_1$ and $X_2$, pressure distribution adjustment, reductions in seal performance sensitivities, reductions in radial flow debris trapping, and reductions in fabrication complexity, time and costs as compared to known seal assemblies may be facilitated while enabling substantially identical reductions in radial flow leakage amounts as known seal assemblies.

Figure 10:
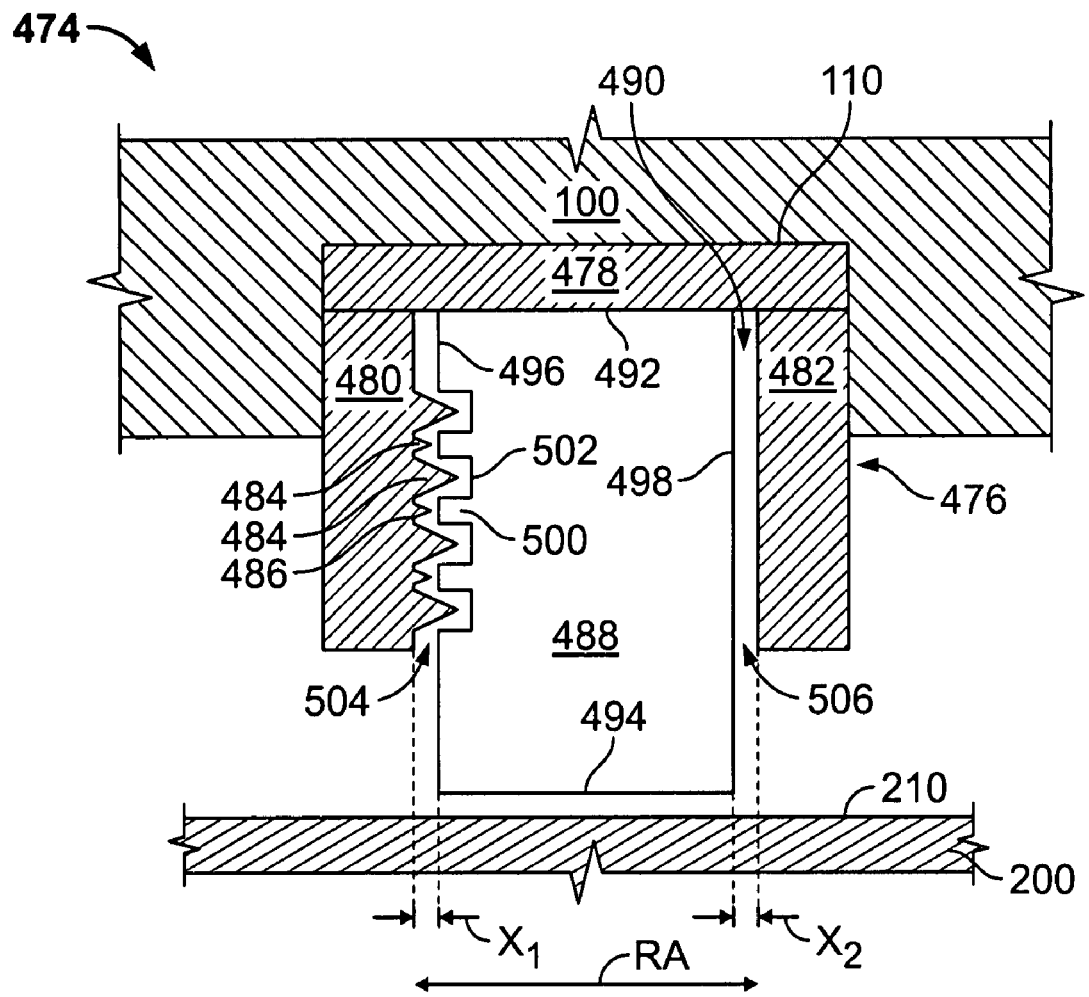
FIG. 10 is schematic illustration of a further alternative seal assembly that may be used with the rotary machine shown in FIG. 1.

FIG. 10 is a schematic illustration of yet another alternative seal assembly 474. Seal assembly 474 is substantially similar to the seal assembly 354 shown in FIG. 6, and components in FIG. 10 that are identical to components of FIG. 6, are identified in FIG. 10 using the same reference numerals used in FIG. 6.

In the exemplary embodiment, seal assembly 474 includes a seal housing 476 including an upper wall 478, a front plate 480, and a back plate 482. In the exemplary embodiment, front and back plates 480 and 482 each include a plurality of projections 484 of varying sizes extending therefrom, and a plurality of recesses 486 defined between pairs of adjacent projections 484. It should be appreciated that projections 484 may extend from and recesses 486 may be defined in any radial portion of respective front and back plates 480 and 482. In one embodiment, projections 484 and/or recesses 486 may be provided on either front plate 480 or back plate 482. It should also be appreciated that any number, shape, size and/or location of projections 484 and/or recesses 486 may be provided. Additionally, it should be appreciated that projections 484 extending from front plate 480 may be staggered with respect to projections 484 extending from back plate 482. Further, it should be appreciated that housing 476 may be fabricated as a unitary structure.

Seal assembly 474 also includes a plurality of compliant plates 488 extending from upper wall 478 such that compliant plates 488 are partially positioned, aligned, and inclined within a cavity 490 defined between front and back plates 480 and 482. Compliant plates 488 each include a radially outward end portion 492, a radially inward tip 494, a front axial edge 496, a rear axial edge 498, and a plurality of projections 500 and a plurality of edge recesses 502 that are defined in front edge 496. It should be appreciated that projections 500 may extend from and recesses 502 may be defined in any radial portion of respective front and rear axial edges 496 and 498. In one embodiment, projections 500 and recesses 502 may be provided on either front axial edge 496 or rear axial edge 498. Additionally, it should be appreciated that projections 500 extending from front edge 496 may be staggered with respect to projections 500 extending from rear edge 498.

When seal assembly 474 is fully assembled, a first axial gap 504 having a width $X_1$ is defined between front plate 480 and compliant plates 488, and a second axial gap 506 having a width $X_2$ is defined between compliant plates 488 and back plate 482. During operation of seal assembly 474, for example, flow in the radial direction partially follows a flow path defined by projections 484 and 500 and recesses 486 and 502. By providing projections 484 and 500 only extending from limited portions of front and/or back plates 480 and 482 and compliant plates 488 respectively, radial flow restrictions, effective gap formations, increased gap widths $X_1$ and $X_2$, pressure distribution adjustment, reductions in seal performance sensitivities, reductions in radial flow debris trapping, and reductions in fabrication complexity, times and costs as compared to known seal assemblies may be facilitated while enabling substantially identical reductions in radial flow leakage amounts as known seal assemblies.

In each exemplary embodiment, the above-described seal assemblies include seal housings and/or compliant plates that include radial airflow restrictors such as, but not limited to, projections and/or recesses. Although "flow" and "radial flow" are explicitly mentioned with respect to the exemplary embodiments for ease of understanding, it should be appreciated that the exemplary seal assemblies described herein may be also be used to control and/or restrict any type of flow such as, but not limited to, steam flow. It should also be appreciated that exemplary seal assemblies may include various combinations of seal housings and compliant plates shown and/or described above with respect to the various exemplary embodiments. As a result, the exemplary radial flow restrictors facilitate maintaining a pressure differential in a rotary machine.

Because the radial airflow restrictors result in a tortuous leakage flow path, the exemplary seal assemblies may be formed with larger gap widths between seal housings and compliant plates as compared to smaller gap widths of some known seal assemblies while providing substantially identical effective flow restrictions. As a result, the exemplary seal assemblies provide for larger gap widths and manufacturing tolerances to facilitate reducing associated manufacturing costs as compared to some known seal assemblies fabricated with an entire front and/or back plate having smaller gap widths with respect to the compliant plates when assembled. Furthermore, larger gaps also facilitate reducing the possibility of such gaps being clogged with debris from the flow and reducing the sensitivity of compliant plate lift and/or blowdown to gap variations caused by, for example, manufacturing imperfections. Therefore, the exemplary seal assemblies include components with radial flow restrictors that facilitate increasing functionality, increasing seal robustness, lowering manufacturing obstacles, and/or lowering manufacturing costs.

Exemplary embodiments of seal assemblies are described above in detail. The seal assemblies are not limited to use with the specific rotary machine embodiments described herein, but rather, the seal assemblies and/or axial actuating mechanisms can be utilized independently and separately from other rotary machine components described herein. Moreover, the invention is not limited to the embodiments of the seal assemblies described above in detail. Rather, other variations of seal assembly embodiments may be utilized within the spirit and scope of the claims.

While the invention has been described in terms of various specific embodiments, those skilled in the art will recognize that the invention can be practiced with modification within the spirit and scope of the claims.

What is claimed is:

1. A method for assembling a rotary machine including a rotary component and a stationary component, said method comprising:
   providing a seal housing including a front plate and a back plate that is spaced from the front plate such that a cavity is defined between the front plate and the back plate;
   coupling a plurality of flexible compliant plates to at least one of the seal housing and the stationary component such that the compliant plates are spaced from the front plate and the back plate within the cavity; and
   coupling a plurality of projections to at least one of the seal housing and the compliant plates such that the plurality of projections facilitate reducing flow through at least one of a first axial gap and a second axial gap that are defined between the seal housing and the compliant plates.

2. A method in accordance with claim 1 wherein coupling the plurality of projections to the at least one of the seal housing and the compliant plates comprises coupling the plurality of projections to the seal housing.

3. A method in accordance with claim 2 further comprising forming at least one recess in each of the compliant plates to partially define at least one of the first gap and the second gap.

4. A method in accordance with claim 3 wherein forming the at least one recess in each of the compliant plates to partially define at least one of the first gap and the second gap comprises forming the at least one recess to be complementary to the plurality of projections.

5. A method in accordance with claim 2 further comprising adjusting a width of at least one of the first gap and the second gap by moving the plurality of projections with respect to a central rotational axis of the rotary component.

6. A method in accordance with claim 1 wherein coupling the plurality of projections to the at least one of the seal housing and the compliant plates comprises coupling the plurality of projections to the compliant plates.

7. A method in accordance with claim 6 further comprising forming at least one recess in at least one of the front plate and the back plate of the seal housing to partially define at least one of the first gap and the second gap.

8. A method in accordance with claim 1 wherein coupling the plurality of projections to the at least one of the seal housing and the compliant plates comprises coupling one of the plurality of projections to the seal housing and coupling another of the plurality of projections to the compliant plates.

9. A method in accordance with claim 1 further comprising coupling a plurality of projections of varying sizes.

10. A seal assembly for a rotary machine including a rotary component and a stationary component, said seal assembly comprising:
  a seal housing comprising a front plate and a back plate that is spaced from said front plate such that a cavity is defined between said front plate and said back plate;
  a plurality of flexible compliant plates spaced from said front plate and said back plate and coupled to at least one of said seal housing and the stationary component within said cavity; and
  a plurality of projections coupled to at least one of said seal housing and said compliant plates such that said plurality of projections facilitate reducing flow through at least one of a first axial gap and a second axial gap that are defined between said seal housing and said compliant plates.

11. A seal assembly in accordance with claim 10 wherein said plurality of projections is coupled to said seal housing.

12. A seal assembly in accordance with claim 11 further comprising at least one recess formed in each of said compliant plates to partially define at least one of said first gap and said second gap.

13. A seal assembly in accordance with claim 12 wherein said at least one recess is complementary to said plurality of projections.

14. A seal assembly in accordance with claim 11 further comprising an actuating mechanism that adjusts a width of at least one of said first gap and said second gap, said actuating mechanism configured to move said plurality of projections with respect to a central rotational axis of said rotary component.

15. A seal assembly in accordance with claim 10 wherein said plurality of projections is coupled to each of said compliant plates.

16. A seal assembly in accordance with claim 15 further comprising at least one recess formed in at least one of said front plate and said back plate of said seal housing to partially define at least one of said first gap and said second gap.

17. A seal assembly in accordance with claim 10 wherein one of said plurality of projections is coupled to said seal housing and another of said plurality of projections is coupled to said compliant plates.

18. A seal assembly in accordance with claim 10 wherein said plurality of projections include a plurality of projections of varying sizes.

19. A rotary machine comprising:
  a stationary component fixed against rotation;
  a rotary component including an axis of rotation, said rotary component is coaxial and opposite said stationary component; and
  a seal assembly coupled to said stationary component, said seal assembly comprising:
    a seal housing comprising a front plate and a back plate that is spaced from said front plate such that a cavity is defined between said front plate and said back plate;
    a plurality of flexible compliant plates spaced from said front plate and said back plate and coupled to at least one of said seal housing and said stationary component within said cavity; and
    a plurality of projections coupled to at least one of said seal housing and said compliant plates such that said plurality of projections facilitate reducing flow through at least one of a first axial gap and a second axial gap that are defined between said seal housing and said compliant plates.

20. A rotary machine in accordance with claim 19 wherein said plurality of projections includes a plurality of projections of varying sizes.

* * * * *